US009036819B2

(12) United States Patent
Saga

(10) Patent No.: US 9,036,819 B2
(45) Date of Patent: May 19, 2015

(54) BROADCAST RECEIVING APPARATUS AND CONTROL METHOD THEREOF

(75) Inventor: Yoshihiro Saga, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1187 days.

(21) Appl. No.: 12/499,355

(22) Filed: Jul. 8, 2009

(65) Prior Publication Data

US 2010/0014667 A1 Jan. 21, 2010

(30) Foreign Application Priority Data

Jul. 17, 2008 (JP) ................................ 2008-186502

(51) Int. Cl.
*H04N 7/167* (2011.01)
*H04H 60/23* (2008.01)
*H04H 20/91* (2008.01)

(52) U.S. Cl.
CPC ............... *H04H 60/23* (2013.01); *H04H 20/91* (2013.01)

(58) Field of Classification Search
USPC ............................................................ 725/25
See application file for complete search history.

(56) References Cited

U.S. PATENT DOCUMENTS 6,061,756 A * 5/2000 Dutton et al. ................ 710/311
6,650,754 B2 * 11/2003 Akiyama et al. .............. 380/278
6,785,390 B1 * 8/2004 Hiraide ......................... 380/262
2003/0026342 A1 * 2/2003 Horiike et al. ........... 375/240.25
2003/0179320 A1 * 9/2003 Kim .............................. 348/732
2005/0018853 A1 * 1/2005 Lain et al. .................... 380/277
2005/0108700 A1 * 5/2005 Chen et al. .................... 717/168
2005/0138645 A1 * 6/2005 Lu ................................ 719/321
2005/0203968 A1 * 9/2005 Dehghan et al. .............. 707/203
2006/0046640 A1 * 3/2006 Ooi ............................. 455/3.02
2006/0073890 A1 * 4/2006 McAllister et al. ............. 463/29
2006/0095935 A1 5/2006 Ooi et al.
2006/0126839 A1 * 6/2006 Koike et al. .................. 380/240
2006/0293895 A1 * 12/2006 Nishigaki ..................... 704/258
2007/0172059 A1 * 7/2007 Yamaguchi et al. .......... 380/228
2007/0226448 A1 * 9/2007 Hirayama ..................... 711/170

FOREIGN PATENT DOCUMENTS

CN 1596522 A 3/2005
CN 1633778 A 6/2005
JP 2008-035534 2/2008
JP 2008-205987 9/2008
WO 03/030447 A2 4/2003
WO 03/032573 A2 4/2003

OTHER PUBLICATIONS

Oct. 21, 2010 Chinese Office Action that issued in Chinese Patent Application No. 200910159171.8.

* cited by examiner

*Primary Examiner* — Andrew Goldberg
(74) *Attorney, Agent, or Firm* — Cowan, Liebowitz & Latman, P.C.

(57) ABSTRACT

The present invention provides a broadcast receiving apparatus that receives a broadcast wave containing multiple channels. The apparatus comprises, among other things, a selecting unit that selects a channel from the broadcast wave; a determination unit that determines, for all channels that can be selected by the selecting unit, whether or not the obtaining unit can obtain an encrypted second-type encryption key that can be decrypted by the decrypting unit using the updated first-type encryption key; and an updating unit that updates the computer program stored in the memory to the updated program in the case where the determination unit has determined that the obtainment is possible for all the channels.

4 Claims, 9 Drawing Sheets

BROADCAST RECEIVING APPARATUS AND CONTROL METHOD THEREOF

BACKGROUND OF THE INVENTION

1. Field of the Invention

The present invention relates to a broadcast receiving apparatus and a control method thereof, and particularly relates to a technique related to the protection of content.

2. Description of the Related Art

In digital terrestrial broadcasting, content is sent in a scrambled state. The content is scrambled using a Conditional Access System (CAS). At present, a B-CAS system, which uses a smartcard, is employed as such a Conditional Access System.

This system of protecting content (and the copyright of the content in particular) in a broadcast receiving apparatus is called RMP (Rights Management and Protection). A system that encrypts content using an encryption key is used as one system of RMP. For example, in the current B-CAS system, three types of encryption keys, or a scrambling key, a work key, and a master key, are used hierarchically.

Meanwhile, a new content protection system (called a "new RMP system" hereinafter) is being proposed as of late. In the new RMP system, three types of encryption keys, or a scrambling key, a work key, and a device key are used hierarchically.

The scrambling key is changed every few seconds in order to improve the reliability of the content protection. The scrambling key is sent in a state in which it has been encrypted using the work key. The encrypted scrambling key is contained in data called an ECM (Entitlement Control Message).

The work key is also sent in an encrypted state. The key for encrypting the work key is the master key, in the conventional RMP system, and the device key, in the new RMP system. The encrypted work key is contained in data called an EMM (Entitlement Management Message).

The master key is a key stored in the B-CAS card, provided on a card-by-card basis. On the other hand, the device key is a key provided on a maker-by-maker or model-by-model basis. Thus broadcast receiving apparatuses from the same maker or broadcast receiving apparatuses of the same model have identical device keys. Broadcast receiving apparatuses also have device IDs corresponding to their device keys. Broadcast receiving apparatuses hold, as firmware, a program that generates a device key from device key information corresponding to a device ID, and the device ID.

The new RMP system has a scheme for revoking broadcast receiving apparatuses that improperly avoid the content protection (called "unauthorized receivers"). Revoking an unauthorized receiver is realized by updating the encryption key used in the encryption of the content and the encryption key held by an authorized receiver (that is, a broadcast receiving apparatus aside from the unauthorized receiver). At that time, the unauthorized receiver cannot update the encryption key, and as a result cannot decrypt the content (see Japanese Patent Laid-Open No. 2006-74209).

The process for revoking an unauthorized receiver is called "revocation". The device key is designed so as to be updatable so that this revocation can be executed. For example, when a device key has been tampered with, the old device key is revoked. In such a case, it is necessary to update both the device key used by the broadcasting station to encrypt the work key and the device key used by the broadcast receiving apparatus to new keys.

However, the following problems arise when executing revocation according to the stated conventional techniques.

First, consider the case where a broadcast receiving apparatus with a certain device ID has been identified as an unauthorized receiver. In this case, the broadcaster performs revocation with respect to the broadcast receiving apparatus that has that device ID. However, the broadcast receiving apparatuses that have that device ID include both unauthorized receivers and authorized receivers.

As a result, when the revocation is executed, the authorized receivers that have that device ID are also revoked in spite of the fact that they are not being used improperly. For this reason, users of authorized receivers suffer in that they cannot view broadcasted content.

To prevent users of authorized receivers from actually suffering in such a manner, the maker of the broadcast receiving apparatuses distributes, to authorized receivers, new device IDs, and programs for generating new device keys corresponding thereto. This information is, as described earlier, contained within the firmware, and thus this distribution is realized through a firmware update performed by the broadcast receiving apparatus. Therefore, users of authorized receivers are required to execute this firmware update.

However, if a broadcast receiving apparatus executes the firmware update before the device key used by the broadcasting station is updated, that broadcast receiving apparatus cannot decrypt content, and thus the user thereof cannot view that content.

SUMMARY OF THE INVENTION

Having been conceived in light of such circumstances, it is a characteristic of the present invention to suppress the occurrence of a state in which a user of an authorized receiver cannot view content during the revocation of an unauthorized receiver.

According to an aspect of the present invention, there is provided a broadcast receiving apparatus that receives a broadcast wave containing multiple channels, the apparatus comprising: a generating unit that generates a first-type encryption key in accordance with a computer program stored in a memory; a selecting unit that selects a channel from the broadcast wave; an obtaining unit that obtains an encrypted second-type encryption key and encrypted content from the channel selected by the selecting unit; a decrypting unit that decrypts the encrypted second-type encryption key using the first-type encryption key generated by the generating unit and decrypts the encrypted content using the decrypted second-type encryption key; a receiving unit that receives an updated computer program for the generating unit to generate an updated first-type encryption key; a determination unit that determines, for all channels that can be selected by the selecting unit, whether or not the obtaining unit can obtain an encrypted second-type encryption key that can be decrypted by the decrypting unit using the updated first-type encryption key; and an updating unit that updates the computer program stored in the memory to the updated computer program in the case where the determination unit has determined that the obtainment is possible for all the channels.

According to another aspect of the present invention, there is provided a control method for a broadcast receiving apparatus that receives a broadcast wave containing multiple channels, the method comprising: a generating step of generating a first-type encryption key in accordance with a computer program stored in a memory; a selecting step of selecting a channel from the broadcast wave; an obtaining step of obtaining an encrypted second-type encryption key and encrypted content from the channel selected in the selecting step; a decrypting step of decrypting the encrypted second-type encryption key using the first-type encryption key generated in the generating step and decrypting the encrypted content using the decrypted second-type encryption key; a receiving step of receiving an updated computer program for an updated first-type encryption key to be generated in the generating step; a determination step of determining, for all channels that can be selected in the selecting step, whether or not an encrypted second-type encryption key that can be decrypted in the decrypting step using the updated first-type encryption key can be obtained in the obtaining step; and an updating step of updating the computer program stored in the memory to the updated computer program in the case where it has been determined in the determination step that the obtainment is possible for all the channels.

Further features of the present invention will become apparent from the following description of exemplary embodiments with reference to the attached drawings.

DESCRIPTION OF THE EMBODIMENTS

Embodiments of the present invention shall be described hereinafter.

First Embodiment

Figure 1:
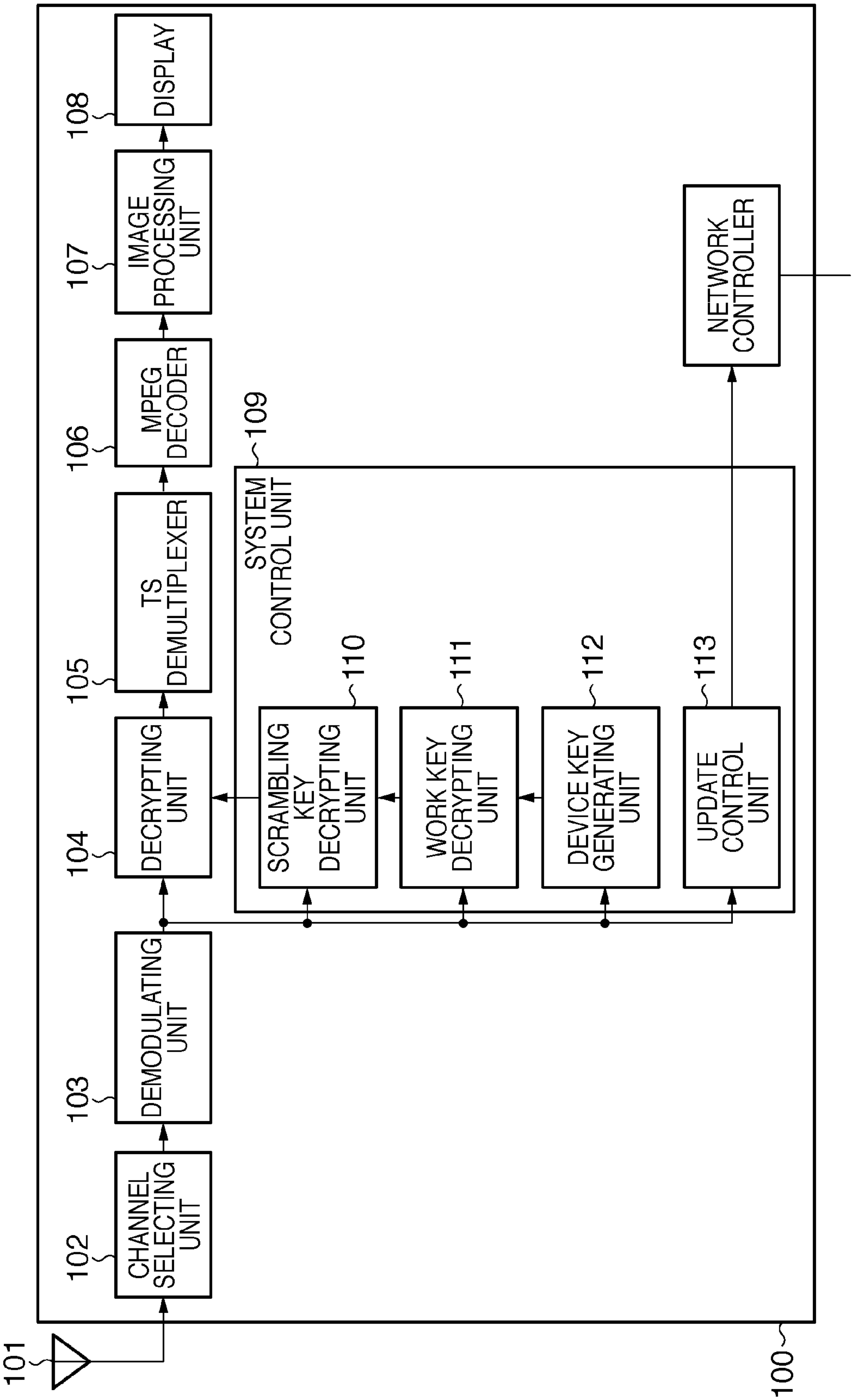
FIG. 1 is a block diagram illustrating the configuration of a broadcast receiving apparatus according to a first embodiment of the present invention.

FIG. 1 is a block diagram illustrating the configuration of a broadcast receiving apparatus 100 according to a first embodiment of the present invention.

In FIG. 1, a channel selecting unit 102 receives a broadcast wave received by an antenna 101 and selects a desired channel therefrom. A demodulation unit 103 demodulates the modulated signal. A decrypting unit 104 decrypts scrambled (that is, encrypted) content using a scrambling key.

A TS demultiplexer 105 extracts necessary streams from the transport stream (TS). An MPEG decoder 106 decodes MPEG data and extracts video data therefrom. An image processing unit 107 converts the format of the image signal, adjusts the luminance, tone, or the like, and outputs the resultant as an image signal. A display 108 displays the image signal.

A system control unit 109 controls the various blocks within the broadcast receiving apparatus 100.

Figure 2:
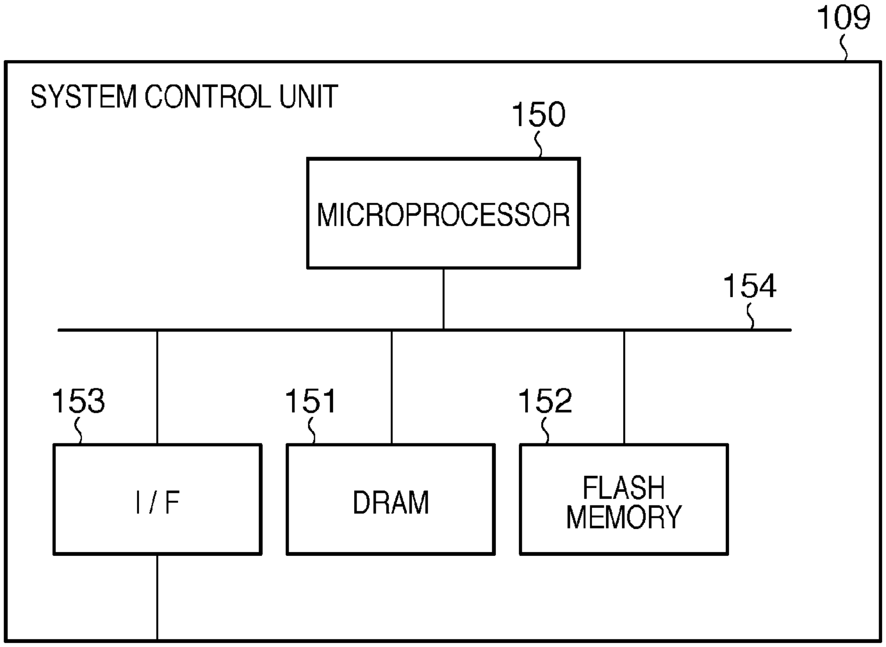
FIG. 2 is a diagram illustrating the hardware configuration of a system control unit in the broadcast receiving apparatus according to the first embodiment.

Next, referring to FIG. 2, the hardware configuration of the system control unit 109 shall be described. The system control unit 109 includes a microprocessor 150, a DRAM 151, a flash memory 152, an interface (I/F) 153, and a bus 154.

The microprocessor 150 is a processor that sequentially processes instructions written as programs. The DRAM 151 is a volatile memory that stores programs, data, and so on. The flash memory 152 is a non-volatile memory that stores programs and initial data, as well as a device ID and the like.

Programs for controlling the receiver, programs for realizing a new RMP system, programs provided with algorithms for generating device keys used in the new RMP system, initial data, and so on are stored in the flash memory 152 as firmware.

Hereinafter, to simplify the descriptions, portions of the programs (firmware) of the broadcast receiving apparatus 100 that are related to the new RMP system shall be denoted simply as "RMP".

The I/F 153 is an interface that enables communication with other blocks in the broadcast receiving apparatus 100.

The bus 154 is a bus that connects the various blocks of the system control unit 109, and those blocks exchange data with one another via the bus 154.

Returning to FIG. 1, the system control unit 109 includes a scrambling key decrypting unit 110, a work key decrypting unit 111, a device key generating unit 112, and an update control unit 113. The functions of these blocks are realized by the microprocessor 150 executing programs (RMP).

The scrambling key decrypting unit 110 decrypts the encrypted scrambling key using a work key (a second-type encryption key). The work key decrypting unit 111 decrypts the encrypted work key using a device key (a first-type encryption key). The device key generating unit 112 receives device key information corresponding to the device ID and generates a device key in accordance with RMP algorithms.

The aforementioned decrypting unit 104 decrypts content directly using the scrambling key; however, it is necessary for the scrambling key decrypting unit 110 to decrypt the scrambling key using the work key in order to obtain that scrambling key. Therefore, conceptually speaking, the decrypting unit 104 and the scrambling key decrypting unit 110 can be thought of as working cooperatively to decrypt the content using the work key.

The update control unit 113 controls the firmware updates executed by the system control unit 109. The firmware is stored in the flash memory 152, and is expanded in the DRAM 151 and executed when the broadcast receiving apparatus 100 is operated.

Figure 3:
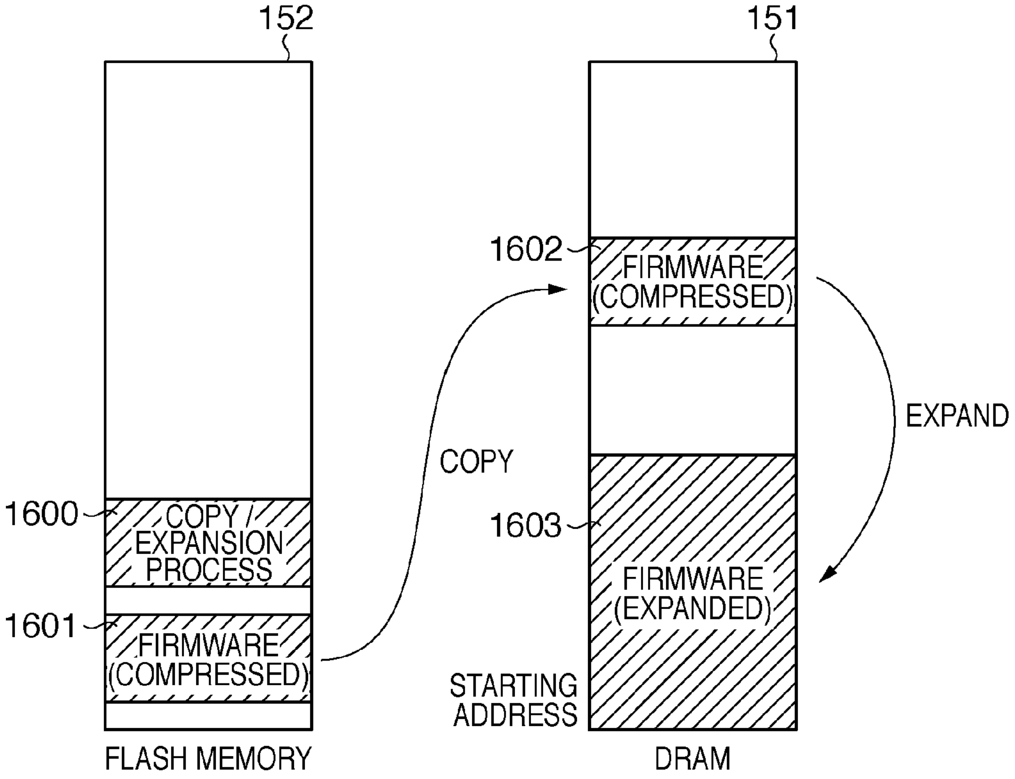
FIG. 3 is a diagram illustrating operations performed when the broadcast receiving apparatus according to the first embodiment is started up.

Next, operations performed when the broadcast receiving apparatus 100 is started up shall be described with reference to FIG. 3. Compressed firmware 1601 and software 1600 that copies data, expands compressed data, and so on are stored in the flash memory 152.

First, when the broadcast receiving apparatus 100 is turned on, a copy/expansion process of the software 1600 is executed. This process copies the firmware 1601 that is present in the flash memory 152 into the DRAM 151. As a result, the compressed firmware 1602 is stored in the DRAM 151. Next, this copy/expansion process expands the compressed firmware 1602. As a result, the expanded firmware 1603 is stored in the DRAM 151.

At the end of the copy/expansion process, the microprocessor 150 jumps to the starting address of the firmware 1603. This launches the firmware, completing the startup of the broadcast receiving apparatus 100.

Figure 4:
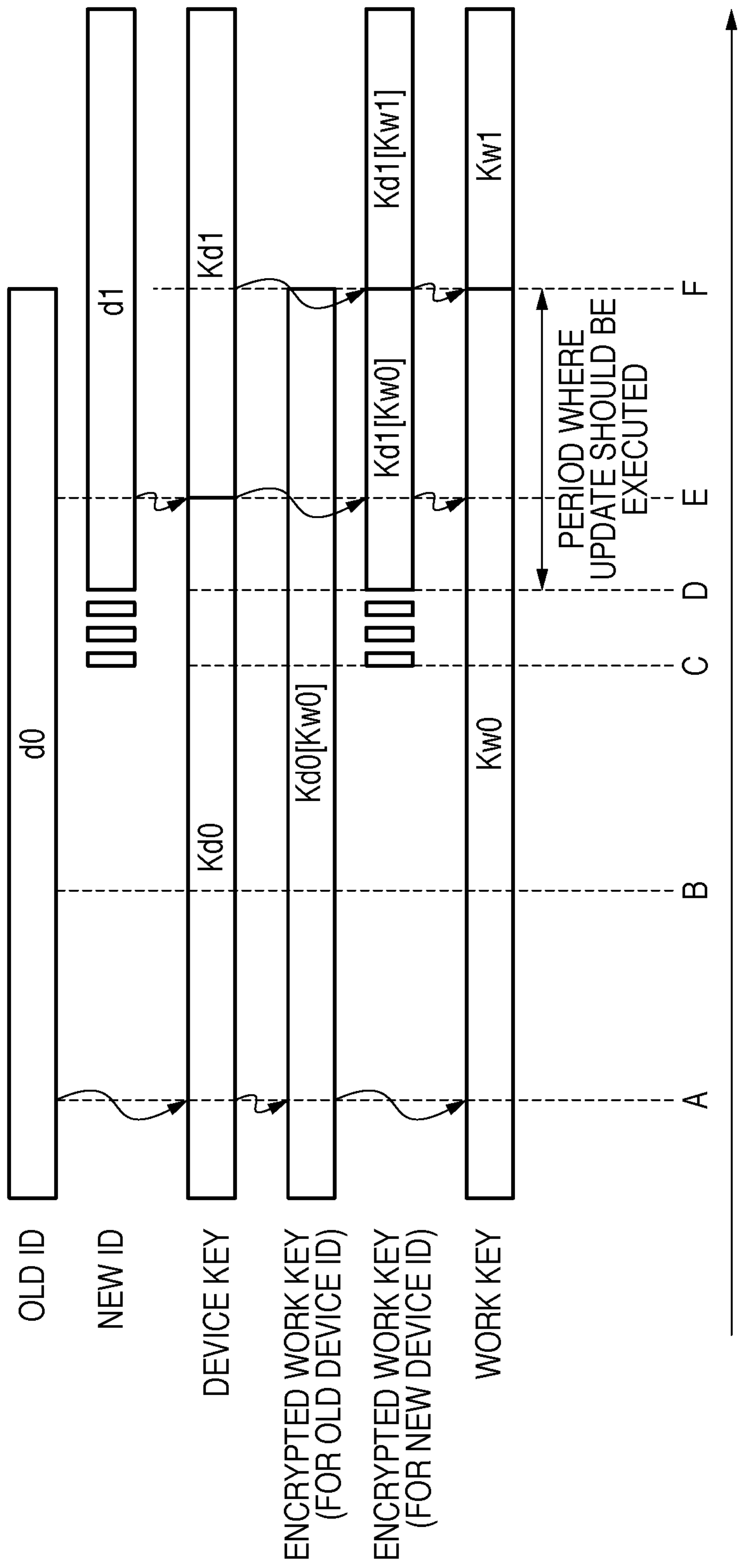
FIG. 4 is a diagram illustrating the state of broadcast waves and the timing of a firmware update before and after revocation.

Next, the state of broadcast waves and the timing of a firmware update before and after revocation shall be described with reference to FIG. 4. In FIG. 4, the horizontal axis represents time, with the passage of time moving in the direction from left to right.

A broadcaster encrypts content using the scrambling key and sends that content, encrypts the scrambling key using the work key and sends the encrypted scrambling key, and furthermore encrypts the work key using the device key and sends the encrypted work key as well. Therefore, the encrypted work key and the encrypted content are obtained from the channel selected by the channel selecting unit 102 shown in FIG. 1.

Here, the work key prior to an update caused by revocation is Kw0, whereas the work key following the update caused by revocation is Kw1. Furthermore, the device ID of the broadcast receiving apparatus 100 prior to an RMP update is d0, and the device ID following the update is d1; likewise, the device key prior to the update is Kd0, and the device key following the update is Kd1.

Before the presence of an unauthorized receiver is discovered, the broadcaster encrypts the scrambling key using the work key Kw0 and sends the encrypted scrambling key, and furthermore encrypts the work key Kw0 using the device key Kd0 and sends the resulting Kd0[Kw0].

It is assumed that the presence of an unauthorized receiver is discovered at time A. The broadcaster therefore determines that revocation is to be performed. The broadcaster then contacts the maker of the broadcast receiving apparatus, informing the maker that the revocation will be performed and on what date/time the revocation will take place.

In response, the maker prepares firmware containing updating RMP. It is necessary for the maker to prepare the updating RMP far enough in advance of the revocation (that is, when the content will no longer be able to be decrypted using the work key Kw0) so that the user will not become unable to view broadcasts. The firmware including this RMP includes a newly-issued device ID "d1" and a device key generation algorithm.

At time B, the maker commences the distribution of the updating firmware. The firmware is sent via broadcast wave. Alternatively, the firmware may be distributed using a communication line such as the Internet.

At time C, some broadcasting stations generate the device key Kd1 using the newly-issued device ID "d1", generate Kd1[Kw0] by decrypting the encrypted work key using that device key, and commence the sending of Kd1[Kw0].

Although multiple broadcasting stations are present, there is no guarantee that the time at which each broadcasting station commences the sending of the new device ID "d1", the work key Kd1[Kw0] corresponding thereto, and so on will be the same.

At time D, all the broadcasting stations are sending the newly-issued device ID "d1" and the work key Kd1[Kw0] encrypted using the device key Kd1. Therefore, it is necessary for the broadcast receiving apparatus 100 to update the RMP at time D or later.

For example, the broadcast receiving apparatus 100 updates the RMP at time E. As a result, the device ID of the broadcast receiving apparatus 100 is changed to d1. Furthermore, the device key generating unit 112 generates an updated device key Kd1 through the device key generation algorithm provided by the updated RMP. It is thus possible for the broadcast receiving apparatus 100 to decrypt Kd1[Kw0] and obtain Kw0.

At time F, each broadcasting station executes revocation. As a result, the work keys included in the EMM sent by each broadcasting station are updated to Kd1[Kw1]. It is therefore necessary for the broadcast receiving apparatus 100 to update the RMP prior to time F.

Unauthorized receivers cannot update these keys. As a result, unauthorized receivers cannot hold the device key Kd1, and thus cannot decrypt Kd1[Kw1] and obtain Kw1. Therefore, after time F, users of unauthorized receivers cannot view the content.

On the other hand, because authorized receivers have already obtained Kd1 at time E, those receivers can obtain Kw1 by decrypting Kd1[Kw1] using Kd1, even after time F; thus users of those receivers can view the content.

Next, the timing at which the broadcast receiving apparatus 100 is to update the RMP shall be described in further detail. Because some of the broadcasting stations have not yet commenced the sending of Kd1[Kw0], if the broadcast receiving apparatus 100 updates the RMP prior to time D, it cannot obtain Kw0 for those broadcasting stations, and thus cannot decrypt the content.

Meanwhile, if the broadcast receiving apparatus 100 has not yet updated the RMP after time F, it cannot decrypt Kd1[Kw1], and therefore cannot decrypt the content.

The period in which the RMP should be updated is therefore the period spanning from time D to time F.

Figure 5:
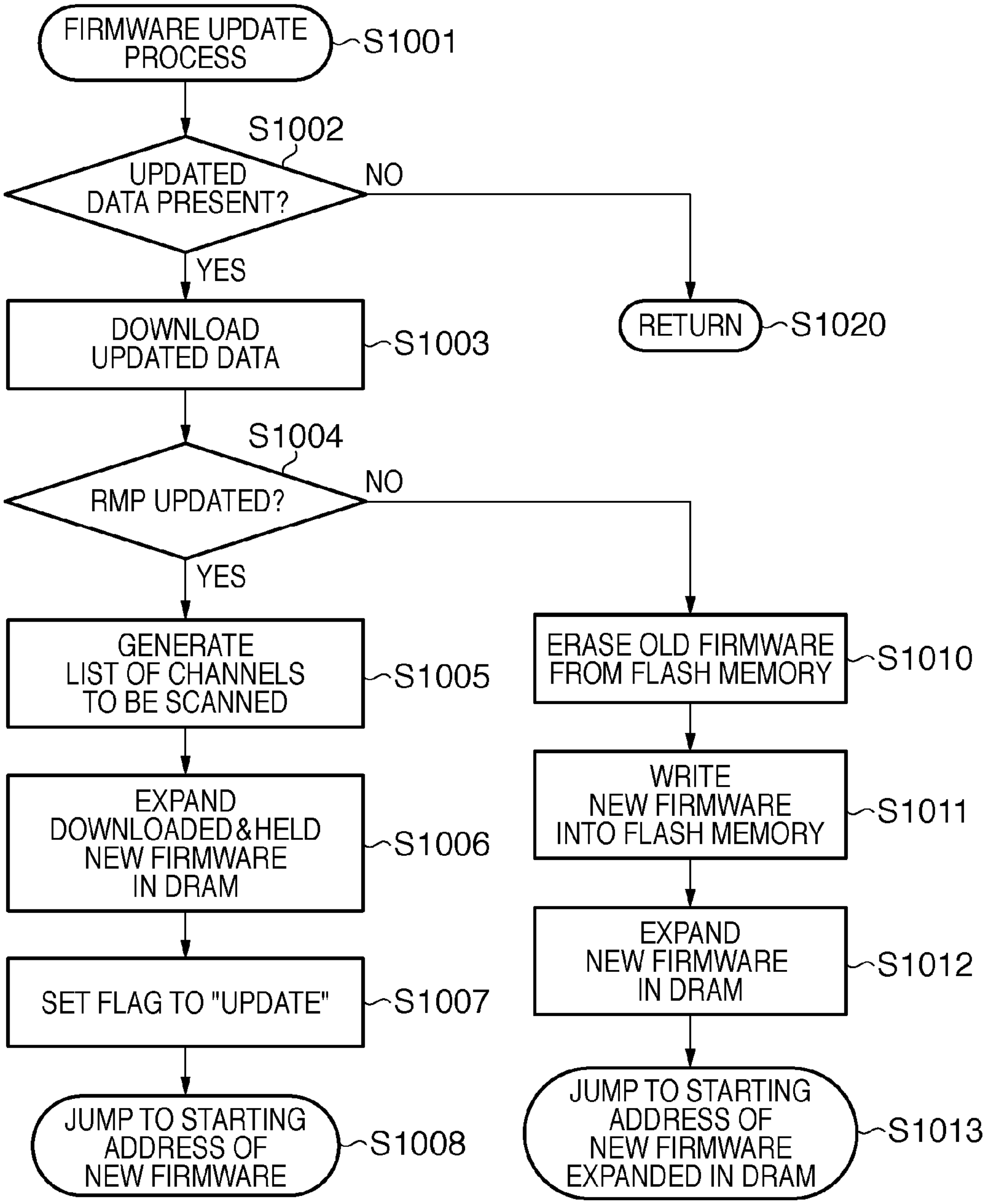
FIG. 5 is a flowchart illustrating the flow of processing by which a broadcast receiving apparatus updates its firmware according to the first embodiment.
Figure 6A:
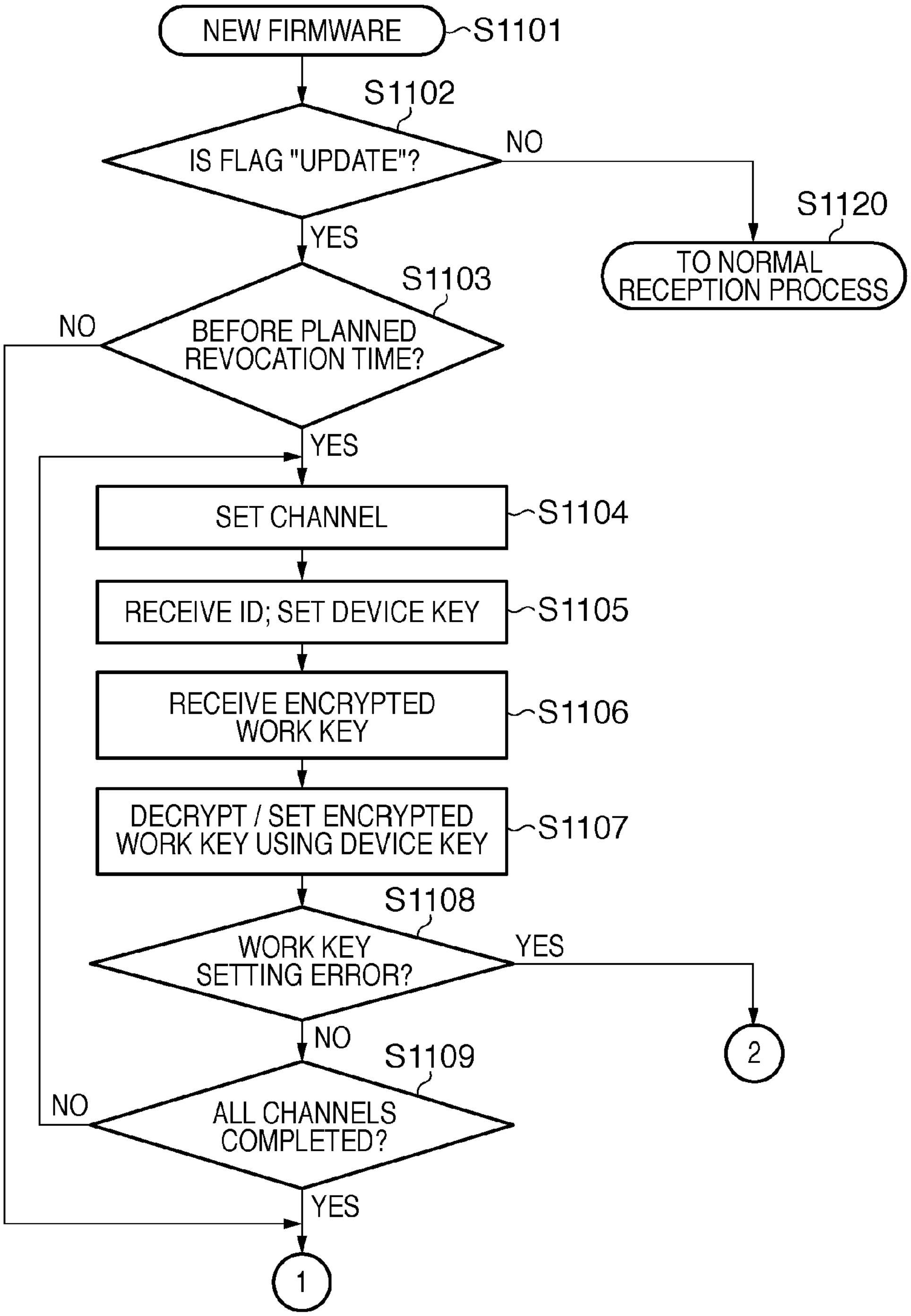
FIGS. 6A and 6B are flowcharts illustrating the flow of processing by which a broadcast receiving apparatus updates its firmware according to the first embodiment.
Figure 6B:
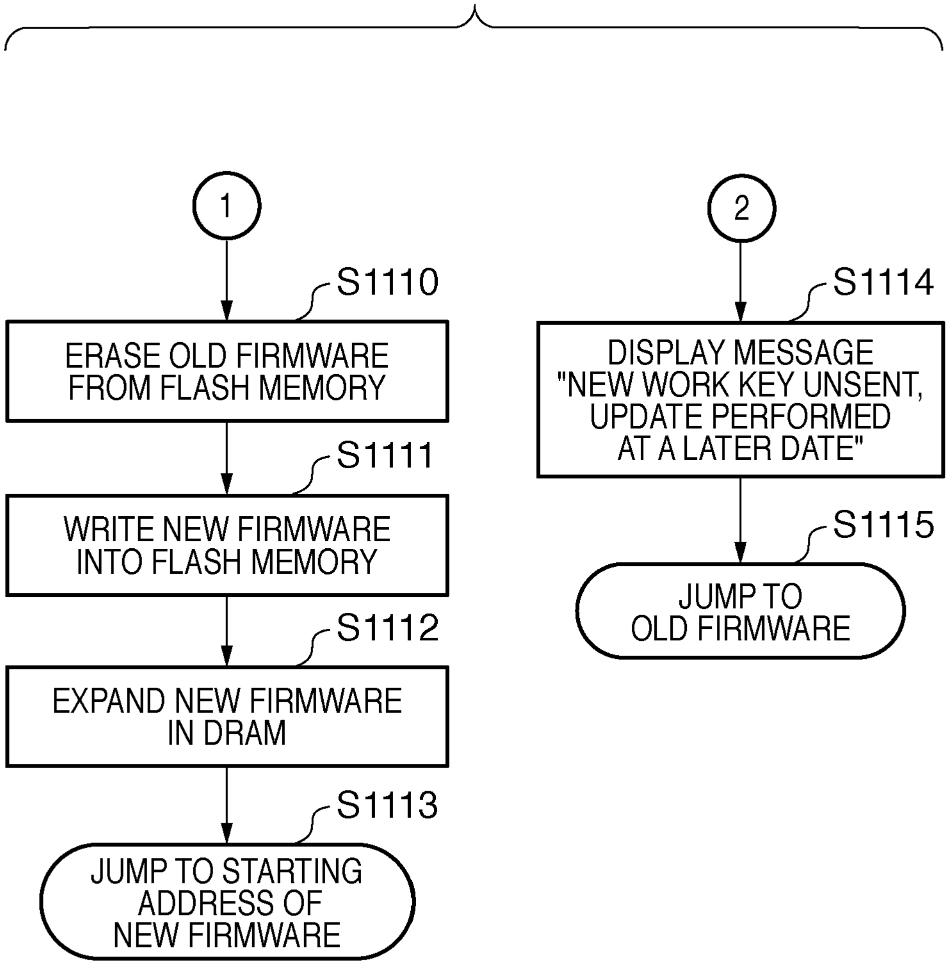

Hereinafter, the flow of the processing by which the broadcast receiving apparatus 100 updates the RMP shall be described with reference to FIGS. 5, 6A, and 6B. The processes in the steps shown in FIGS. 5, 6A, and 6B are realized by the microprocessor 150 (see FIG. 2) executing the firmware 1603 (see FIG. 3).

The broadcast receiving apparatus 100 launches a firmware update process at predetermined times (for example, once a day or once a week). The firmware update process starts with S1001 in FIG. 5.

In S1002, the broadcast receiving apparatus 100 determines whether or not updated firmware is present. This process is performed by checking an SDTT (Software Download Trigger Table) contained in PSI (Program Specific Information). If no new firmware is present, the process advances to S1020, where the firmware update process ends. However, if new firmware is present, the process advances to S1003.

In S1003, the broadcast receiving apparatus 100 downloads (receives) the updated firmware.

In S1004, the broadcast receiving apparatus 100 determines whether or not updated RMP is contained in the updated firmware. A flag indicating whether or not the RMP has been updated is provided in the updated firmware in advance in a specific location. The broadcast receiving apparatus 100 makes the stated determination by checking this flag.

If it has been determined in S1004 that no updated RMP is present, the broadcast receiving apparatus 100 carries out a normal update process. In other words, the broadcast receiving apparatus 100 erases the firmware 1601 from the flash memory 152 in S1010, and then records the new firmware into free space in the flash memory 152 in S1011. Then, the broadcast receiving apparatus 100 expands the new firmware in the DRAM 151 in S1012, and then jumps to the starting address of the new firmware, which has been expanded, in S1013. This completes the firmware update process.

Meanwhile, if it has been determined in S1004 that updated RMP is present, the broadcast receiving apparatus 100 generates a list of channels to be scanned in S1005. The channels that are to be scanned include all the channels that can be selected by the channel selecting unit 102. In addition, because RMP schemes differ from band to band, this list is generated from channels that have been divided into groups of identical band slots, such as digital terrestrial broadcasting.

In S1006, the broadcast receiving apparatus 100 expands the new firmware downloaded in S1003 in the DRAM 151, and in S1007, sets an update flag. This flag indicates that the firmware is in the process of being updated. After this, the broadcast receiving apparatus 100 jumps to the starting address of the new firmware in S1008 (continued in FIG. 6A).

S1101 in FIG. 6A indicates the starting address of the new firmware, and the broadcast receiving apparatus 100 commences processing from S1101.

In S1102, the broadcast receiving apparatus 100 checks the update flag. If the update flag is a value that indicates the firmware is not being updated, the process advances to S1120, where the broadcast receiving apparatus 100 commences normal reception processing. However, if the update flag is a value that indicates the firmware is being updated, the process advances to S1103.

In S1103, the broadcast receiving apparatus 100 determines whether or not the current time, obtained from a clock (not shown), is before a planned revocation time. The planned revocation time is obtained (detected) via broadcast waves or a communication medium such as the Internet. If the current time is before the planned revocation time, the process advances to S1104. However, if the planned revocation time has already passed, the process advances to S1110, where the broadcast receiving apparatus 100 executes the firmware update (details of this shall be given later). In other words, once the planned revocation time has passed, the broadcast receiving apparatus 100 executes the firmware update regardless of the result of the determination discussed hereinafter.

The processing from S1104 to S1109 is a process for confirming that a work key corresponding to the new device key Kd1 is being sent over all channels.

In S1104, the broadcast receiving apparatus 100 determines a channel to receive. In the first iteration of this loop, the channel selecting unit 102 is set to receive the first channel in the channel list. The channel is then changed according to the listed order in the second and subsequent iterations.

In S1105, the broadcast receiving apparatus 100 receives device key information corresponding to the new device ID "d1" and obtains the new device key Kd1 by inputting that information into the device key generating unit 112. This process is executed by the newly-downloaded firmware, and thus the device key generating unit 112 also operates in accordance with the updated algorithm. For this reason, the generated device key is the new device key Kd1.

In S1106, the broadcast receiving apparatus 100 receives the encrypted work key and decrypts it using the new device key Kd1. If, at this time, the encrypted work key is Kd1 [Kw0], the correct work key Kw0 is generated, whereas if the encrypted work key is not Kd1[Kw0], an indefinite data string is generated. The broadcast receiving apparatus 100 sets the decrypted work key (which, of course, may be the stated indefinite data string) in a register located in the scrambling key decrypting unit 110. If the scrambling key could not be generated normally, the scrambling key decrypting unit 110 sets an error flag to "1".

In S1108, the broadcast receiving apparatus 100 confirms whether or not the work key is correct by checking the error flag. The process advances to S1109 if an error has not occurred. However, if an error has occurred, the process advances to S1114, where the broadcast receiving apparatus 100 displays an error message. The fact, for example, that there are broadcasting stations that have not yet sent the work key corresponding to the updated RMP, or that a firmware update will be carried out at a later date, may be denoted in the error message. Then, in step S1115, the broadcast receiving apparatus 100 re-expands the old firmware in the DRAM 151 and jumps to the starting address thereof.

Meanwhile, in S1109, the broadcast receiving apparatus 100 determines whether or not the processing from S1104 to S1108 has been completed for all the channels that can be selected by the channel selecting unit 102. If this processing has been completed, the process advances to S1110, whereas if the processing has not been completed, the process returns to S1104 and then repeats the same processing for the next channel.

If a work key capable of being decrypted using the new device key Kd1 is being sent by all the channels that can be selected by the channel selecting unit 102 (that is, if the process has advanced from S1109 to S1110), the broadcast receiving apparatus 100 carries out the update process. The same action is taken if the planned revocation time has passed (that is, if the process has advances from S1103 to S1110).

In other words, the broadcast receiving apparatus 100 erases the firmware 1601 from the flash memory 152 in S1110, and then records the new firmware into free space in the flash memory 152 in S1111. Then, the broadcast receiving apparatus 100 expands the new firmware in the DRAM 151 in S1112, and then jumps to the starting address of the new firmware, which has been expanded, in S1113. This completes the firmware update process.

As described thus far, according to the present embodiment, the broadcast receiving apparatus 100 executes the RMP update after it has confirmed that the device key that encrypts the work key has been updated in all the channels that can be selected.

This makes it possible to suppress the occurrence of a state in which a user of an authorized receiver cannot view content during the revocation of an unauthorized receiver.

Second Embodiment

A second embodiment shall be described next. The configuration of the broadcast receiving apparatus 100 in the present embodiment is identical to that described in the first embodiment, and thus descriptions thereof shall be omitted. In the second embodiment, rather than actually executing the updated RMP, the broadcast receiving apparatus 100 uses an update number (identification information) contained in the EMM to determine whether or not the device key has been updated across all the channels that can be selected.

The broadcast receiving apparatus 100 obtains an EMM update number for each channel and records these in the flash memory 152 as an EMM update number list.

Hereinafter, the flow of the processing by which the broadcast receiving apparatus 100 updates the RMP shall be described with reference to FIGS. 7, 8A, and 8B. The processes in the steps shown in FIGS. 7, 8A, and 8B are realized by the microprocessor 150 (see FIG. 2) executing the firmware 1603 (see FIG. 3).

Figure 7:
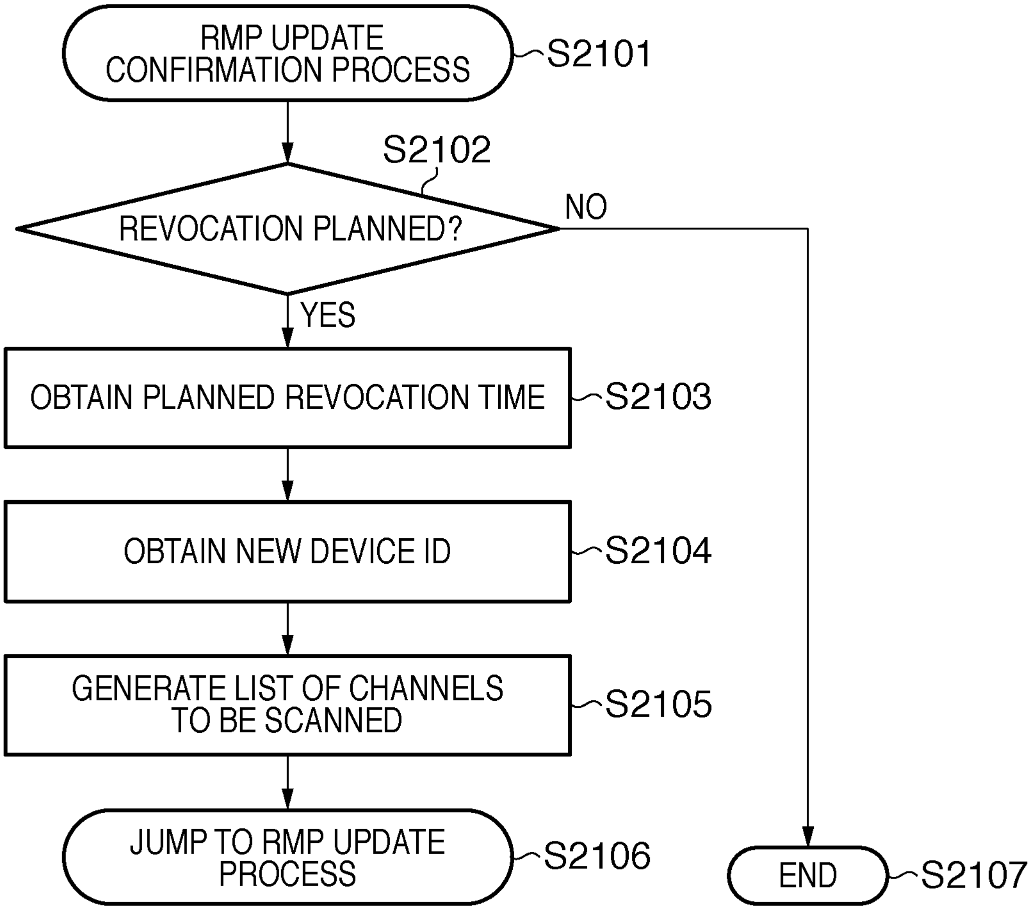
FIG. 7 is a flowchart illustrating the flow of processing by which a broadcast receiving apparatus updates its firmware according to a second embodiment.

The broadcast receiving apparatus 100 commences an RMP update confirmation process in S2101, shown in FIG. 7. First, in S2102, the broadcast receiving apparatus 100 determines whether or not there is a plan to perform a revocation in the near future. Information regarding planned revocations can be obtained via broadcast waves, an Internet connection, or the like. If it has been determined in S2102 that there is no planned revocation, there is no need to update the RMP, and thus the process advances to S2107 and ends. However, if there is a planned revocation, the process advances to S2103.

Figure 8A:
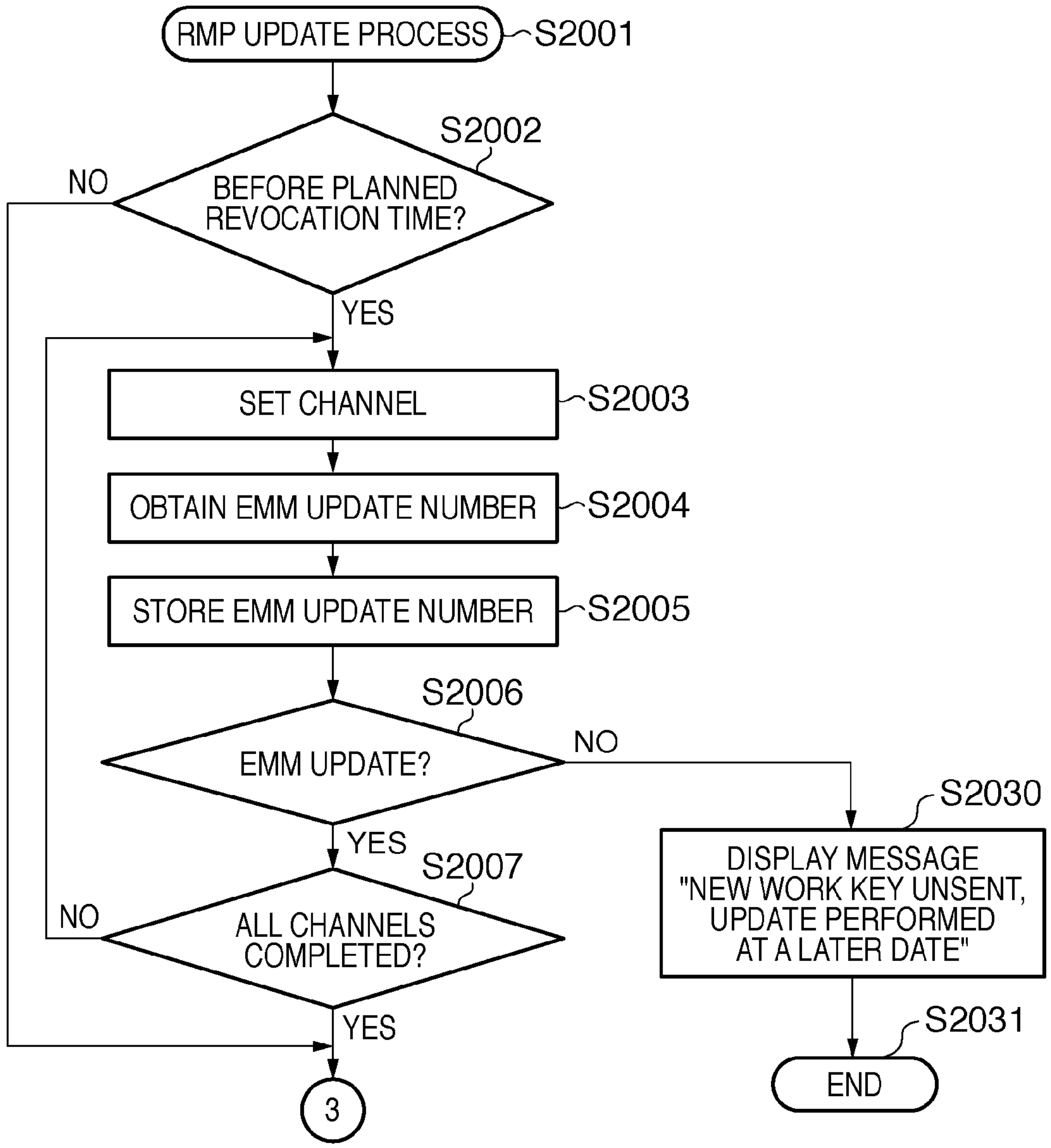
FIGS. 8A and 8B are flowcharts illustrating the flow of processing by which a broadcast receiving apparatus updates its firmware according to the second embodiment.
Figure 8B:
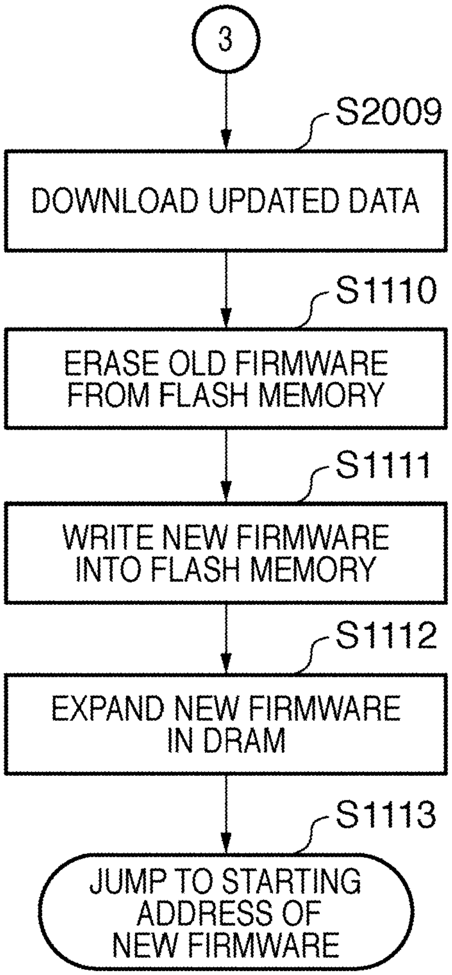

The broadcast receiving apparatus 100 obtains the planned revocation time in S2103, obtains a new device ID in S2104, generates a list of channels to be scanned in S2105, and jumps to the RMP update process in S2106 (continued in FIG. 8A).

The broadcast receiving apparatus 100 commences the RMP update process from S2001, shown in FIG. 8A. In FIGS. 8A and 8B, steps that perform processes identical to those in FIGS. 6A and 6B are given identical reference numerals, and descriptions thereof shall be omitted.

In S2002, the broadcast receiving apparatus 100 determines whether or not the current time, obtained from a clock (not shown), is before the planned revocation time obtained in S2103. If the current time is before the planned revocation time, the process advances to S2003. However, if the planned revocation time has already passed, the process advances to S2009, where the broadcast receiving apparatus 100 executes the firmware update (details of this shall be given later). In other words, once the planned revocation time has passed, the broadcast receiving apparatus 100 executes the firmware update regardless of the result of the determination discussed hereinafter.

The processing from S2003 to S2007 is a process for confirming that a work key corresponding to the new device key Kd1 is being sent over all channels.

In S2003, the broadcast receiving apparatus 100 determines a channel to receive. In the first iteration of this loop, the channel selecting unit 102 is set to receive the first channel in the channel list. The channel is then changed according to the listed order in the second and subsequent iterations.

In S2004, the broadcast receiving apparatus 100 obtains the EMM update number form the selected channel, and stores the obtained EMM update number in the DRAM 151 in S2005. The new device ID, which has already been obtained, is used to obtain the update number, and the EMM update number corresponding to that device ID is obtained.

In S2006, the broadcast receiving apparatus 100 compares the obtained EMM update number with an EMM update number stored in the past, for the selected channel. If the EMM update number has changed (for example, if the comparison results in a mismatch and the obtained EMM update number is one number larger than the past EMM update number), the process advances to S2007. However, if the EMM update number has not changed, the process advances to S2030, and the broadcast receiving apparatus 100 displays an error message, as in S1114. In S2031, the broadcast receiving apparatus 100 ends the update process.

Meanwhile, in S2007, the broadcast receiving apparatus 100 determines whether or not the processing from S2003 to S2006 has been completed for all the channels that can be selected by the channel selecting unit 102. If this processing has been completed, the process advances to S2009, whereas if the processing has not been completed, the process returns to S2003 and then repeats the same processing for the next channel.

In S2009, the broadcast receiving apparatus 100 receives the updated firmware that contains the updated RMP. In other words, in the present embodiment, the broadcast receiving apparatus 100 receives the updated firmware after confirming that a work key corresponding to the new device key Kd1 is being sent over all the selected channels.

Then, from S1110 on, the broadcast receiving apparatus 100 executes the same firmware update as in the first embodiment.

When the new firmware is executed, the updated RMP contained in that new firmware operates. A device key is then generated using the new device ID, the work key is updated, and the scrambling key is decrypted. Finally, because the EMM update number has been incremented by 1, the broadcast receiving apparatus 100 updates the EMM update number list and stores that list in the flash memory 152.

As described thus far, according to the present embodiment, rather than actually executing the updated RMP, the broadcast receiving apparatus 100 uses an update number (identification information) contained in the EMM to determine whether or not the device key has been updated in all the channels that can be selected.

This makes it possible to shorten the amount of time required to confirm the update of the device key.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-186502, filed on Jul. 17, 2008, which is hereby incorporated by reference herein in its entirety.

What is claimed is:

1. A broadcast receiving apparatus that receives a broadcast signal containing multiple channels, the apparatus comprising:

a generating unit that generates a first-type encryption key from key information included in the broadcast signal in accordance with a computer program for generating the first-type encryption key stored in a memory;

a selecting unit that selects a channel from the broadcast signal;

an obtaining unit that obtains an encrypted second-type encryption key, identification information identifying the encrypted second-type encryption key, and encrypted content from the channel selected by the selecting unit;

a storing unit that stores the identification information identifying encrypted second-type encryption keys for all channels that can be selected by the selecting unit;

a decrypting unit that decrypts the encrypted second-type encryption key using the first-type encryption key generated by the generating unit and decrypts the encrypted content using the decrypted second-type encryption key;

a receiving unit that receives an updated computer program for the generating unit to generate an updated first-type encryption key;

a determination unit that determines whether or not the obtaining unit can obtain updated encrypted second-type encryption keys for said all channels by causing the selecting unit to select each of said all channels in a sequence and obtaining, for each said channel, identification information identifying the encrypted second-type encryption keys for said channel, wherein the updated encrypted second-type encryption keys can be decrypted by the decrypting unit using the updated first-type encryption key;

a detecting unit that detects the time at which the encrypted content will no longer be able to be decrypted by the decrypting unit using the second-type encryption key decrypted by the decrypting unit; and an updating unit that updates the computer program stored in the memory to the updated computer program and deletes the original computer program in the case where the determination unit has determined that the obtaining unit can obtain updated encrypted second-type encryption keys for said all channels, wherein the determination unit determines that the obtaining unit can obtain updated encrypted second-type encryption keys for said all channels in the case where the identification information obtained during said all channels being selected in said sequence has been changed from the identification information stored by the storing unit;

the receiving unit receives the updated computer program after the determination unit has determined that the obtaining unit can obtain updated encrypted second-type encryption keys for said all channels; and the updating unit executes the update regardless of the result of the determination performed by the determination unit in the case where the time has passed.

2. The broadcast receiving apparatus according to claim 1, further comprising a notification unit that displays an error message in the case where the determination unit has determined that the obtaining unit cannot obtain updated encrypted second-type encryption keys for said all channels.

3. A control method for a broadcast receiving apparatus that receives a broadcast signal containing multiple channels, the method comprising:

a generating step of generating a first-type encryption key from key information included in the broadcast signal in accordance with a computer program for generating the first-type encryption key stored in a memory;

a selecting step of selecting a channel from the broadcast signal;

an obtaining step of obtaining an encrypted second-type encryption key, identification information identifying the encrypted second-type encryption key, and encrypted content from the channel selected in the selecting step;

a storing step of storing the identification information identifying encrypted second-type encryption keys for all channels that can be selected in the selecting step;

a decrypting step of decrypting the encrypted second-type encryption key using the first-type encryption key generated in the generating step and decrypting the encrypted content using the decrypted second-type encryption key;

a receiving step of receiving an updated computer program for an updated first-type encryption key to be generated in the generating step;

a determination step of determining whether or not updated encrypted second-type encryption keys for said all channels can be obtained in the obtaining step by causing the selecting step to select each of said all channels in a sequence and obtaining, for each said channel, identification information identifying the encrypted second-type encryption keys for said channel, wherein the updated encrypted second-type encryption keys can be decrypted in the decrypting step using the updated first-type encryption key;

a detecting step of detecting the time at which the encrypted content will no longer be able to be decrypted by the decrypting step using the second-type encryption key decrypted by the decrypting step; and an updating step of updating the computer program stored in the memory to the updated computer program and deleting the original computer program in the case where it has been determined in the determination step that updated encrypted second-type encryption keys for said all channels can be obtained, wherein the determination step determines that updated encrypted second-type encryption keys for said all channels can be obtained in the case where the identification information obtained during said all channels being selected in said sequence has been changed from the identification information stored in the storing step;

the receiving step receives the updated computer program after the determination step has determined that updated encrypted second-type encryption keys for said all channels can be obtained; and the updating step executes the update regardless of the result of the determination performed by the determination step in the case where the time has passed.

4. The control method according to claim 3, further comprising a notification step of displaying an error message in the case where the determination step has determined that that updated encrypted second-type encryption keys for said all channels cannot be obtained.

* * * * *